US008276476B2

(12) United States Patent
Diccion

(10) Patent No.: US 8,276,476 B2
(45) Date of Patent: Oct. 2, 2012

(54) JOYSTICK OFFSET CONTROLS

(75) Inventor: Amory R. Diccion, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1208 days.

(21) Appl. No.: 11/906,630

(22) Filed: Oct. 3, 2007

(65) Prior Publication Data

US 2009/0090208 A1 Apr. 9, 2009

(51) Int. Cl.
*G05G 9/047* (2006.01)
*B60K 26/00* (2006.01)

(52) U.S. Cl. .................................. 74/471 XY; 180/315

(58) Field of Classification Search ............ 74/471 XY, 74/471 R, 469; 180/315, 333
See application file for complete search history.

(56) References Cited

U.S. PATENT DOCUMENTS

| | | | | | |
|---|---|---|---|---|---|
| RE24,701 | E * | 9/1959 | Redmond | ..................... | 318/580 |
| 3,941,009 | A * | 3/1976 | Brown | ......................... | 74/473.3 |
| 4,332,177 | A | 6/1982 | Andresen | | |
| 4,574,651 | A | 3/1986 | Nordstrom | | |
| 4,884,057 | A | 11/1989 | Leorat | | |
| 5,481,077 | A | 1/1996 | Clegg et al. | | |
| 5,503,040 | A | 4/1996 | Wright | | |
| 5,533,590 | A | 7/1996 | Steffen et al. | | |
| 5,585,608 | A | 12/1996 | Kraemer | | |
| 6,148,593 | A * | 11/2000 | Heinsey et al. | ............ | 56/10.2 R |
| 6,178,841 | B1 | 1/2001 | Ruckert et al. | | |
| H2024 | H | 6/2002 | Kelley et al. | | |
| 6,644,141 | B2 * | 11/2003 | Oikarinen | ................ | 74/471 XY |
| 6,707,501 | B1 * | 3/2004 | McKay et al. | ................ | 348/373 |
| 7,036,250 | B2 | 5/2006 | Dressler et al. | | |
| D526,757 | S | 8/2006 | Bergman et al. | | |
| 7,511,236 | B2 * | 3/2009 | Mack | ......................... | 200/61.54 |
| 7,748,645 | B2 * | 7/2010 | Breese | .......................... | 239/172 |
| 2006/0156848 | A1 | 7/2006 | Gosselin et al. | | |
| 2008/0250089 | A1 * | 10/2008 | Siegwart et al. | .............. | 707/206 |

FOREIGN PATENT DOCUMENTS

WO WO 94/26549 11/1994

OTHER PUBLICATIONS

U.S. Appl. No. 11/948,382; Joystick Attachment, filed Nov. 30, 2007.
U.S. Appl. No. 29/298,206; Joystick Attachment, filed Nov. 30, 2007.
Control Box; believed to be manufactured by Trimble since Oct. 2002, Shown in the three (3) accompanying color photographs.

* cited by examiner

*Primary Examiner* — Justin Krause
(74) *Attorney, Agent, or Firm* — Richard K. Chang

(57) ABSTRACT

A joystick including a base portion, a grip portion extending from and pivotally attached to the base portion, and an offset control portion connected to the grip portion and offset from the grip portion such that the offset control portion moves with the grip portion relative to the base portion. A gap is provided between the offset control portion and the grip portion. The offset control portion includes an input device.

18 Claims, 5 Drawing Sheets

JOYSTICK OFFSET CONTROLS

TECHNICAL FIELD

This invention relates generally to operator interfaces, and more specifically, to joysticks.

BACKGROUND

As new technologies are being developed, more and more functionality may be incorporated into a machine to increase its productivity. For example, construction machines may include automatic grading functionality, global positioning systems, and fully articulated work implements. This increased functionality often requires additional control inputs that are distributed throughout an operator environment. This distribution throughout the operator environment may lead to inefficiencies and exaggerated operator movements in order to engage and control this additional functionality.

Even in video games, control inputs may be inconveniently distributed over the joystick as well as the base of the joystick, which may necessitate an operator take their hands off of the joystick to actuate a control disposed on the base. This can lead to slower reaction time, which can mean the difference between success and failure in a gaming environment.

The present invention is directed to overcome one or more of the problems as set forth above.

SUMMARY OF THE INVENTION

In one example of the present invention, a joystick is provided. The joystick includes a base portion and a grip portion extending from and pivotally attached to the base portion. The joystick also includes an offset control portion that is connected to the grip portion and thus, moves with the grip portion relative to the base portion. The offset control portion is connected to the grip portion such that the offset control portion is offset from the grip portion such that a gap is provided between the offset control portion and the grip portion. The offset control portion includes an input device.

In some configurations, the offset control portion may include a first input device and a second input device disposed more than seventy-five degrees radially about the offset control portion from the first input device. Additionally, the offset control portion may be disposed between about sixty degrees and about one hundred twenty degrees from the front of the grip section.

DETAILED DESCRIPTION

Figure 1:
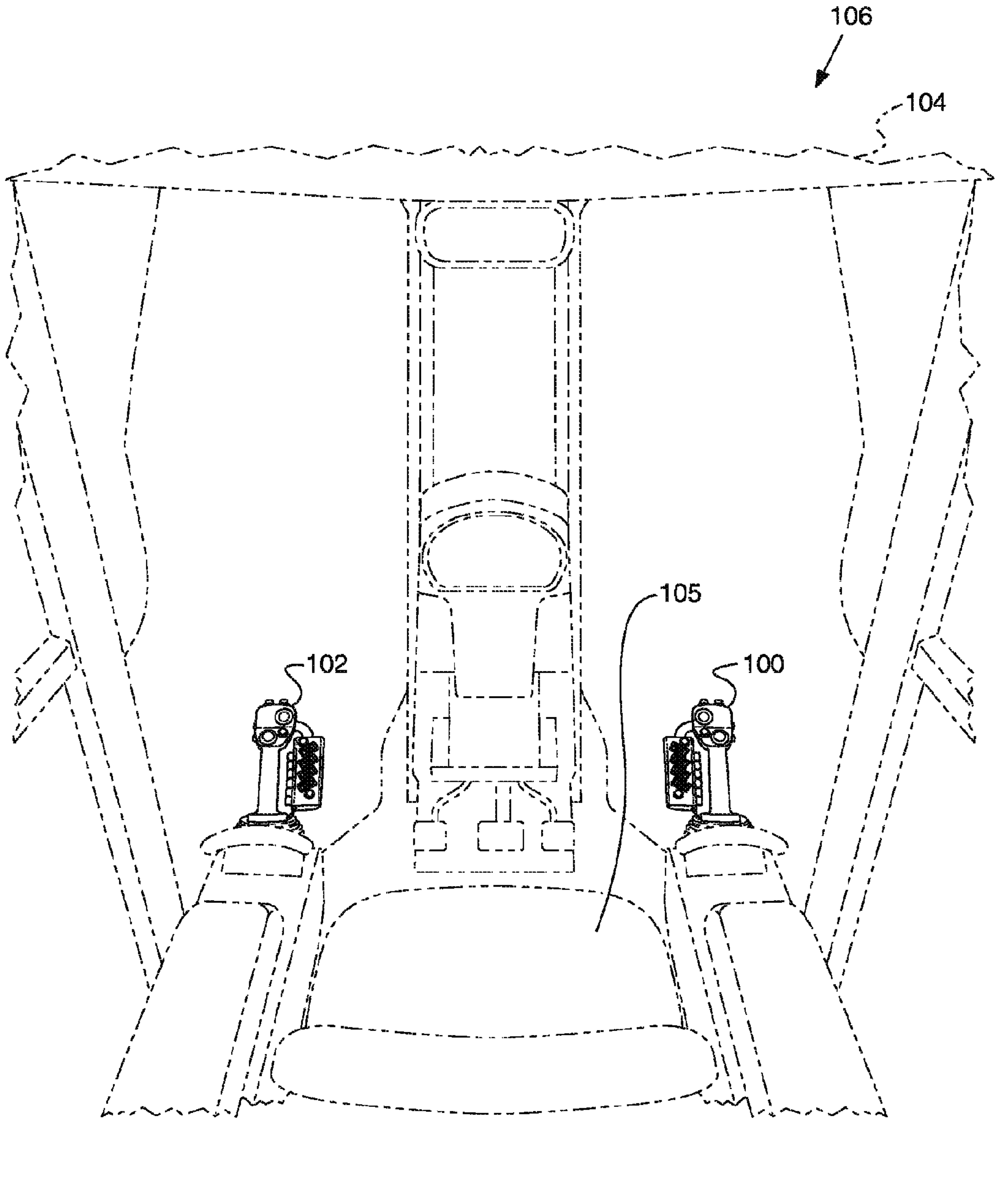
FIG. 1 is a perspective view of a right hand joystick and a left hand joystick in an operator environment of a machine.

Referring to FIG. 1, a perspective view illustrates a right hand joystick 100 and a left hand joystick 102 in an operator environment 104 of a machine 106 (shown in phantom). The operator environment 104 includes an operator's seat 105 for use by an operator while gripping the joysticks 100 and 102.

The machine 106 may be motor grader, track-type tractor, wheel loader, backhoe loader, excavator, skid steer, multi-terrain loader, or any other machine that may be controlled with a joystick. Alternatively, the joysticks 100, 102 may be used to provide inputs to a virtual environment, such as video games or virtual training environments.

As shown, the right hand joystick 100 may be a mirror embodiment of the left hand joystick 102. Alternatively, the right hand joystick 100 may include a different combination of input devices 108 than the left hand joystick 102.

Figure 2:
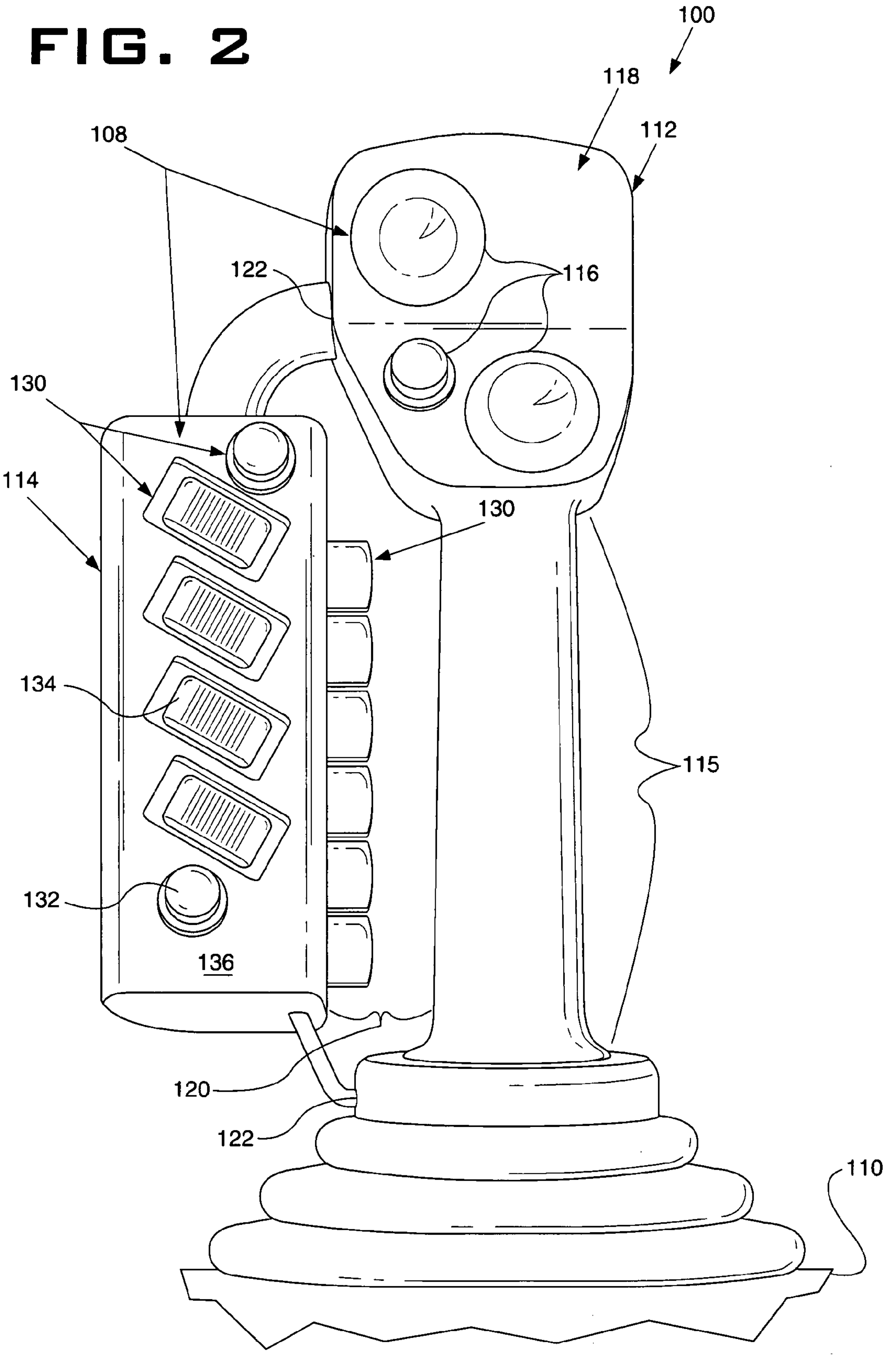
FIG. 2 is a front view of the right hand joystick of FIG. 1.

Referring to FIG. 2, the right hand joystick 100 of FIG. 1 includes a base portion 110, a grip portion 112, and an offset control portion 114. The grip portion 112 extends from and is pivotally attached to the base portion 110. Like ordinary joysticks, the grip portion 112 may be pivoted relative to the base portion 110 to provide a control signal to a machine, computer, or other device.

The grip portion 112 may include a finger section 115 and may optionally include a variety of input devices 116 including buttons, sensors, levers, control sticks, switches and other input mechanisms disposed on the grip portion 112. As shown, the input devices 116 may be disposed remotely from the base portion 110 on a control section 118 of the grip portion 112. In some configurations, an input device (not shown) may be disposed in the finger section 115. Because the input devices 116 may be disposed on the grip portion 112, the input devices 116 move with the grip portion 112 relative to the base portion 110 permitting a hand of an operator (not shown) to actuate the input devices 116 while gripping the grip portion 112.

However, space is relatively limited for input devices 116 on the grip portion 112 that may be conveniently actuated by the hand of the operator while gripping the grip portion 112. To increase space for conveniently actuated input devices, the joystick 100 includes the offset control portion 114 that is connected to the grip portion 112 and thus, moves with the grip portion 112 relative to the base portion 110.

The offset control portion 114 is offset from the grip portion 112 such that a gap 120 is provided between the offset control portion 114 and the grip portion 112. As shown, the offset control portion 114 may be attached to the grip portion 112 at attachment positions 122 above and below the finger section 115 of the grip portion 112. In this configuration, the multiple attachment points between the offset control portion 114 and the grip portion 112 provide a secure connection between the offset control portion 114 and the grip portion 112.

As shown, the offset control portion 114 may include a plurality of input devices 130, such as buttons, sensors, levers, control sticks, switches and other input mechanisms known in the art. The input devices 130 may be disposed on multiple surfaces of the offset control portion 114. For example, the input devices 130 may include buttons 132 and switches 134 disposed on a front surface 136 of the offset control portion 114.

Figure 3:
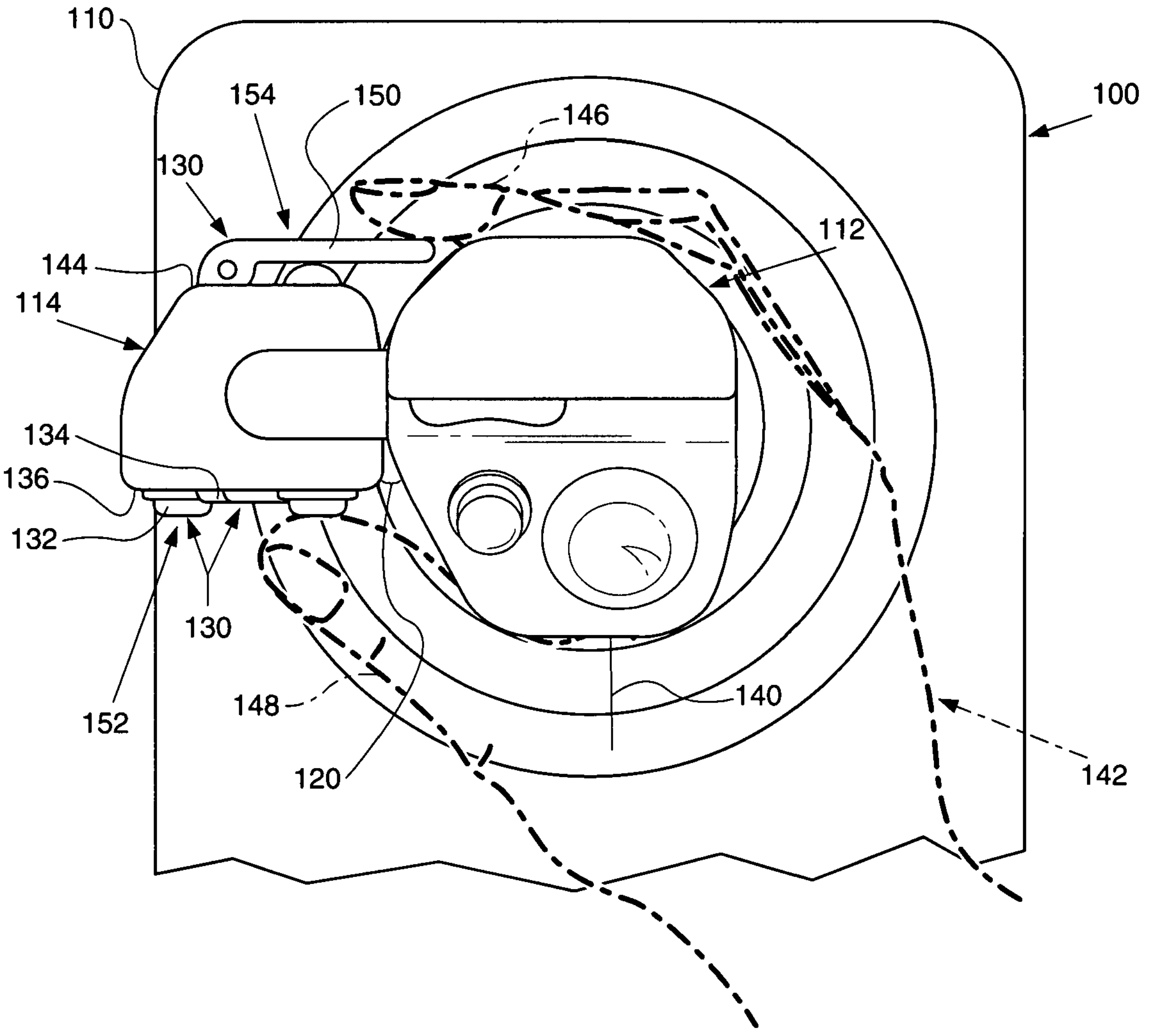
FIG. 3 is a top view of the right hand joystick of FIG. 1.

Referring to FIG. 3, a top view further illustrates the right hand joystick 100 of FIG. 1. As shown, the offset control portion 114 may be disposed about ninety degrees from the front 140 of the joystick 100. In some configurations, the offset control portion 114 may be disposed between about forty-five degrees and about one hundred thirty-five degrees from the front 140 of the joystick 100. In other configurations, the offset control portion 114 may be disposed between about sixty degrees and about one hundred twenty degrees from the front 140 of the joystick 100. With this positioning, the grip portion 112 and the offset control portion 114 may be viewed simultaneously by the operator. Further, the input devices 130 may be actuated by the right hand 142 (shown in phantom) of the operator while holding the grip portion 112.

In some configurations, the offset control portion 114 may include a first input device 152 and a second input device 154 disposed more than seventy-five degrees radially about the offset control portion 114 from the first input device 152. For example, the input devices 130 may include lever arms 150 disposed on other surfaces than the front surface 136, such as the rear surface 144.

The lever arms 150 may extend into the gap 120 and may be actuated by the fingers 146 of the right hand 142 of the operator. Such placement of the input devices 130 permits convenient actuation by the fingers 146 of the right hand 142. Additionally, the buttons 132 and switches 134 may be disposed for convenient actuation by the thumb 148. In other words, the input devices 130 may be selectively disposed for thumb-actuation or finger-actuation.

Figure 4:
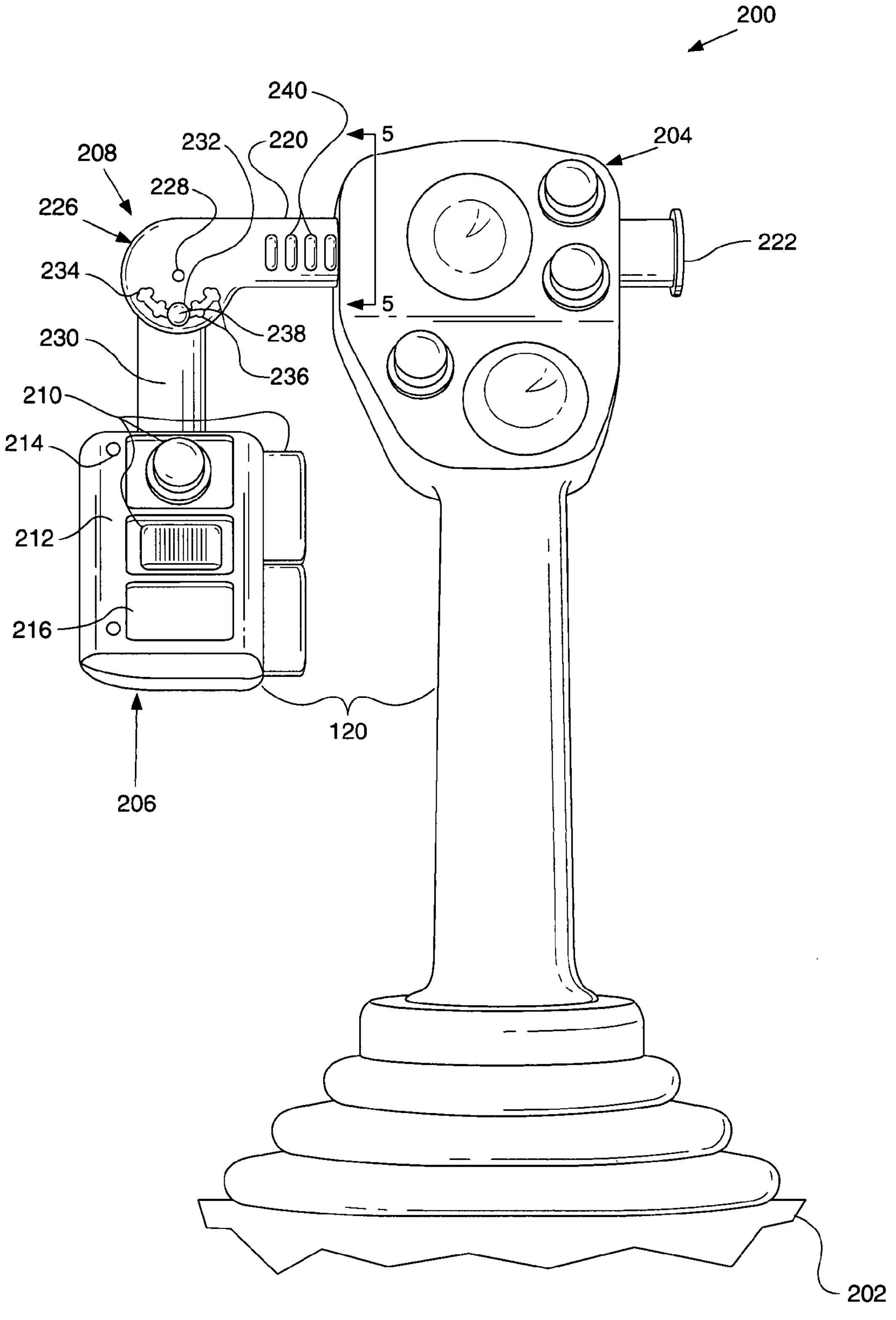
FIG. 4 is a front view of an alternative right hand joystick.

Referring to FIG. 4, a front view illustrates an alternative joystick 200 configuration of the right hand joystick 100 of FIG. 1. As shown, the joystick 200 includes a base portion 202 and a grip portion 204 extending from and pivotally attached to the base portion 202. An offset control portion 206 may be connected to the grip portion 204 via an adjustable positioner 208 and thus, the position of the offset control portion 206 may be adjusted relative to the grip portion 204. Once positioned and secured, the offset control portion 206 moves with the grip portion 204 relative to the base portion 202.

The adjustable positioner 208 permits the gap 120 between the offset control portion 206 and the grip portion 204 to be adjusted for convenient actuation of the input devices 210 of the offset control portion 206 by different operators under different conditions. For example, during the summer an operator may wear thin gloves or no gloves while operating the joystick while during the winter, heavy gloves may be worn. Additionally, operators may have a wide range of hand sizes. Consequently, operators may position the offset control portion 206 of the joystick 200 to facilitate one-handed operation of the joystick 200.

The offset control portion 206 may also include a modular faceplate 212. The modular faceplate 212 may be mounted to the offset control portion 206 by mechanical fasteners 214 such as screws. The modular faceplate 212 permits a modular configuration of the input devices 210. In other words, one or more input devices 210 may be mounted to or removed from the faceplate 212 as desired. Alternatively, the faceplate 212 can be replaced to permit different mounting positions of the input devices 210 on the faceplate 212. In some configurations, a plug 216 may be used when an input device has been removed.

The adjustable positioner 208 may include a wide variety of mechanisms, such as telescoping framework, ball and socket joint, a pin joint, an adjustable strut and other devices known in the art (not shown), for permitting the adjustment of the offset control portion 206 relative to the grip portion 204. For example, the adjustable positioner 208 may include an extendable arm 220 that is slidable within the grip portion 204. Alternatively, the arm 220 may be a telescoping arm, a gas strut, a mechanical strut, a friction locking strut, or any other strut or telescoping assembly known that may be used to adjust the position of the offset control portion 206 relative to the grip portion 204.

The arm 220 may include an end stop 222 to prevent the arm 220 from being pulled out of the grip portion 204. In this configuration, actuating a button 244 (shown in FIGS. 5A and 5B) on the grip portion 204 permits the arm 220 to be adjustably positioned relative to the grip portion 204. Alternatively, the arm may be a telescoping arm, a gas strut, a mechanical strut, a friction locking strut, or any other strut or telescoping assembly known that may be used to adjust the position of the The adjustable positioner 208 may also include a pivotal joint 226 for pivotally adjusting the offset control portion 206 relative to the grip portion 204. Of course, the pivotal joint 226 may be any type of mechanism that permits rotatable or pivotal positioning of the offset control portion 206 relative to the grip portion 204.

As shown, the pivotal joint 226 may include a pivot pin 228 that pivotally connects an extension 230 of the offset control portion 206 to the arm 220 of the grip portion 204. Additionally, a positioning pin 232 may extend through the extension 230 of the offset control portion 206 and a curved slot 234 formed in the arm 220. A plurality of recesses 236 may be disposed along the curved slot 234 for receiving a head 238 of the positioning pin 232. The head 238 of the positioning pin 232 may be biased by a spring 248 (shown in FIGS. 5A and 5B) against one of the plurality of recesses 236 to secure the offset control portion 206 in one of a plurality of orientations relative to the grip portion 204.

For example, the offset control portion 206 may be positioned relative to the grip portion 204 by unseating the head 238 of the positioning pin 232 from one of the plurality of recesses 236. The offset control portion 206 may then be pivoted to a desired orientation and position and the head 238 of the positioning pin 232 seated in the nearest one of the plurality of recesses 236 to maintain the position and orientation of the offset control portion 206 relative to the grip portion 204.

Figure 5A:
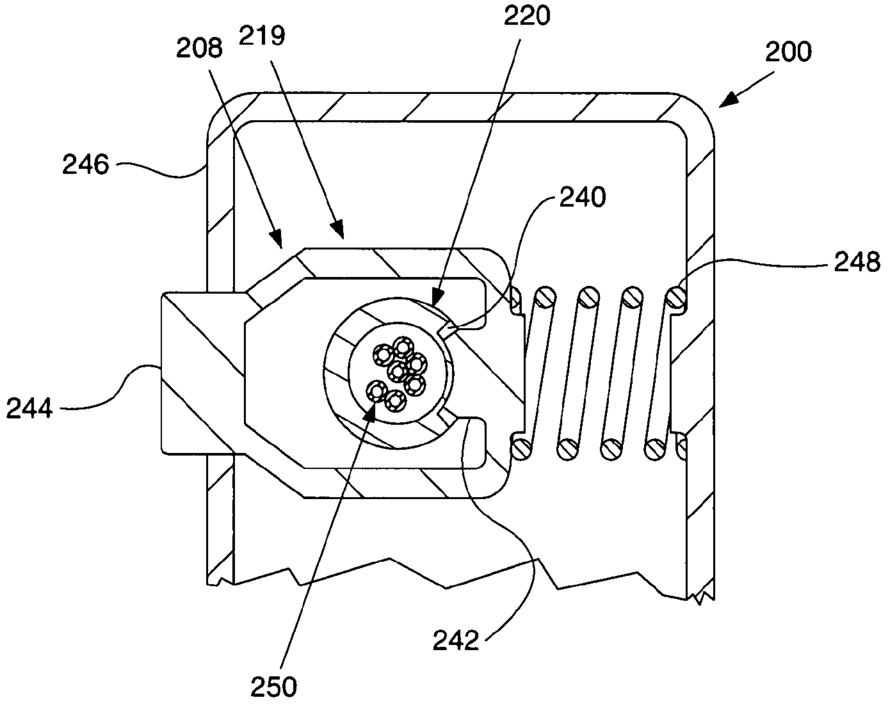
FIGS. 5A and 5B is a cross sectional view the right hand joystick of FIG. 4 along lines 5-5 showing a locking mechanism of an extendible arm of the adjustable positioner.
Figure 5B:
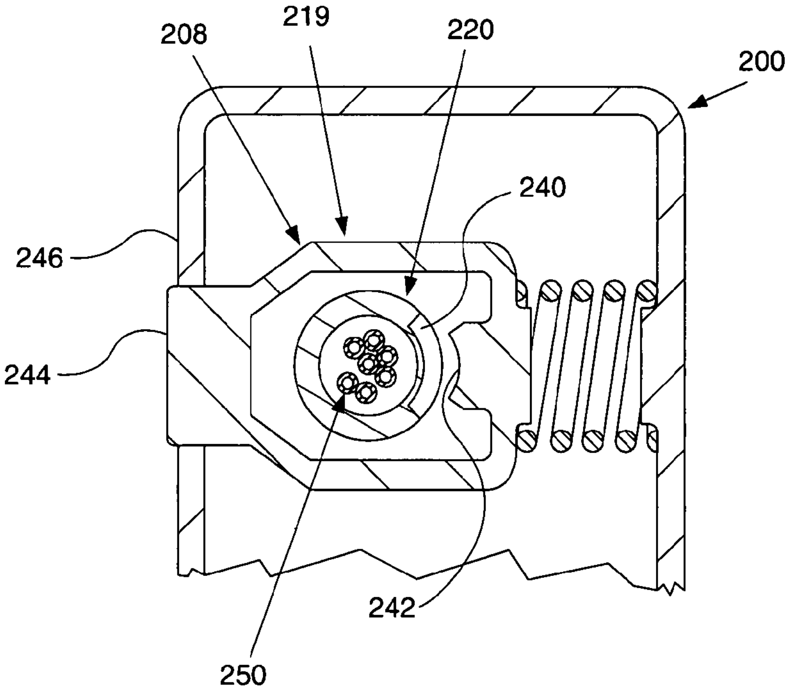

Alternatively, the arm 220 may be moved relative to the grip portion 204 to adjust the position of the offset control portion 206 relative to the grip portion 204. Referring to FIGS. 5A and 5B, a cross sectional view of the right hand joystick 200 of FIG. 3 along lines 5-5 illustrates a locking mechanism 219 of the arm 220 of the adjustable positioner 208. As shown in FIG. 4, the arm 220 may include a plurality of positioning slots 240. One of the plurality of positioning slots 240 may be engaged by a retaining structure 242 that may be integrally formed with a button 244. The button 244 may be disposed on a rear surface 246 or another location of the grip portion 204 to minimize inadvertent actuation. A spring 248 may bias the retaining structure 242 into one of the plurality of positioning slots 240 to retain and secure the arm 220 and the offset control portion 206 in a selected position relative to the grip portion 204.

As shown in this configuration, wires 250 may be passed through the arm 220 that electrically connect the offset control portion 206 with the grip portion 204. Alternatively, a wireless transmitter (not shown) may be used to transmit command signals from the input devices 210 to a receiver (not shown) in the base portion 202 or the grip portion 204 of the joystick 200, or to a receiver (not shown) on the machine 106.

To move the arm 220 relative to the grip portion 204, the button 244, may be actuated to disengage the retaining structure 242 from the positioning slot 240 and compress the spring 248 as shown in FIG. 5B. Once the retaining structure 242 has been disengaged from the positioning slot 240, the arm 220 may be slid to a desired position. The button 244 may than be released allowing the spring 248 to bias the retaining structure 242 into the nearest positioning slot 240 to retain the arm 220 in the selected position relative to the grip portion 204.

Alternatively, the arm 220 may be selectively secured in place via a clamp (not shown) that grips the arm to secure it in a desired position by friction. Additionally, the arm may be selectively secured in position by a turnbuckle or a geared assembly (not shown).

Industrial Applicability

Joysticks may include an offset control portion 114, 206, which permits additional input devices 130, 210 to be positioned for convenient one-handed actuation for improved operator comfort and responsiveness. In configurations that include an adjustable positioner 208, the input devices 210 to be positioned for convenient one-handed actuation by an operator.

It will be apparent to those skilled in the art that various modifications and variations can be made without departing from the scope or spirit of the invention. Additionally, other embodiments of the invention will be apparent to those skilled in the art from consideration of the specification and practice of the invention disclosed herein. It is intended that the specification and examples be considered as exemplary only.

What is claimed is:

1. A joystick having a front surface facing an operator's seat, the joystick comprising:

a base portion;

a grip portion extending from and pivotally attached to the base portion; and an offset control portion having a front surface facing the operator's seat and a rear surface opposite the front surface, and an offset control portion connected to the grip portion, the offset control portion being offset from the grip portion such that a gap is provided between the offset control portion and the grip portion, the offset control portion including an input device, wherein the offset control portion moves with the grip portion relative to the base portion, wherein the offset control portion is disposed between about forty-five degrees and about one hundred thirty-five degrees from the front surface of the joystick.

2. The joystick of claim 1, further comprising an adjustable positioner, wherein the offset control portion is connected with the grip portion via the adjustable positioner.

3. The joystick of claim 2, wherein the adjustable positioner includes an extendable arm.

4. The joystick of claim 2, wherein the adjustable positioner includes a pivotal joint such that the offset control portion is pivotally adjustable relative to the grip portion.

5. The joystick of claim 1, wherein the offset control portion is attached to the grip portion at positions above and below a finger section of the grip portion.

6. The joystick of claim 1, wherein the input device is disposed on the front surface of the offset control portion, the offset control portion further including a second input device disposed on the rear surface of the offset control portion.

7. The joystick of claim 1, wherein the offset control portion includes a modular faceplate.

8. The joystick of claim 1, wherein the offset control portion is disposed between about sixty degrees and about one hundred twenty degrees from the front surface of the joystick.

9. A joystick having a front surface facing an operator's seat, the joystick comprising:

a base portion;

a grip portion extending from and pivotally attached to the base portion; and an offset control portion having a front surface facing the operator's seat and a rear surface opposite the front surface, and an offset control portion moving with the grip portion relative to the base portion, the offset control portion being offset from the grip portion, wherein a gap is provided between the offset control portion and the grip portion, the offset control portion having a first input device located on a front surface of the offset control portion and a second input device located on a rear surface of the offset control portion wherein the first and second input devices are disposed about seventy-five degrees radially about the offset control portion from the first input device.

10. The joystick of claim 9, further comprising an adjustable positioner, wherein the offset control portion is connected with the grip portion via the adjustable positioner.

11. The joystick of claim 10, wherein the adjustable positioner includes an arm slidable within the grip portion.

12. The joystick of claim 10, wherein the adjustable positioner includes a pivotal joint such that the offset control portion is pivotally adjustable relative to the grip portion.

13. The joystick of claim 9, wherein the offset control portion is attached to the grip portion at positions above and below a finger section of the grip portion.

14. The joystick of claim 9, wherein the offset control portion is disposed between about sixty degrees and about one hundred twenty degrees from the front surface of the joystick.

15. The joystick of claim 9, wherein the first input device is configured to be thumb-actuated and the second input is configured to be finger-actuated while an operator's hand is holding the grip portion.

16. A joystick having a front surface facing an operator's seat, the joystick comprising:

a base portion;

a grip portion extending from and pivotally attached to the base portion;

an offset control portion having a front surface facing the operator's seat and a rear surface opposite the front surface, and an offset control portion connected to and offset from the grip portion such that a gap is provided between the offset control portion and the grip portion, the offset control portion being disposed between about seventy-five degrees and about one hundred five degrees from the front of the grip portion, wherein the offset control portion moves with the grip portion relative to the base portion, the offset control portion having a first input device located on a front surface of the offset control portion and a second input device located on a rear surface of the offset control portion wherein the first input device and a second input device are disposed more than ninety degrees radially about the offset control portion from the first input device.

17. The joystick of claim 16, wherein the offset control portion is connected with the grip portion via an adjustable positioner.

18. The joystick of claim 17, wherein the adjustable positioner includes a pivotal joint such that the offset control portion is pivotally adjustable relative to the grip portion.

* * * * *